United States Patent
Ding et al.

(10) Patent No.: US 7,336,197 B2
(45) Date of Patent: Feb. 26, 2008

(54) LED LIGHTING SYSTEM FOR LINE SCAN CAMERA BASED MULTIPLE DATA MATRIX SCANNERS

(75) Inventors: Kexiang Ken Ding, San Diego, CA (US); Brian Avery, San Dimas, CA (US); Kenneth B. Uekert, Ramona, CA (US); Samer Kabbani, San Marcos, CA (US); Torsak Sethanant, San Diego, CA (US)

(73) Assignee: Delta Design, Inc., Poway, CA (US)

( * ) Notice: Subject to any disclaimer, the term of this patent is extended or adjusted under 35 U.S.C. 154(b) by 125 days.

(21) Appl. No.: 11/392,955

(22) Filed: Mar. 30, 2006

(65) Prior Publication Data

US 2006/0232436 A1 Oct. 19, 2006

Related U.S. Application Data

(60) Provisional application No. 60/666,307, filed on Mar. 30, 2005.

(51) Int. Cl.
*G08B 5/22* (2006.01)
(52) U.S. Cl. .......................... 340/815.45; 340/815.54; 235/462.42
(58) Field of Classification Search ........... 340/815.45, 340/815.4, 815.54; 250/559.4, 208.1, 553, 250/559.34, 559.2, 226; 324/158.1; 235/462.42, 235/462.32, 455, 462.45
See application file for complete search history.

(56) References Cited

U.S. PATENT DOCUMENTS 5,365,084 A * 11/1994 Cochran et al. ....... 250/559.02
5,532,467 A    7/1996 Roustaei et al.
5,585,616 A * 12/1996 Roxby et al. .......... 235/462.06
5,684,290 A   11/1997 Arackellian et al.
6,207,946 B1 * 3/2001 Jusoh et al. ............. 250/208.1
7,234,641 B2 * 6/2007 Olmstead .................... 235/454

OTHER PUBLICATIONS

Advanced Illumination, Lighting for Machine Vision, http://www.advill.com, 2006, 4 pgs.
Machine Vision News, Paper Web Inspection with Intelligent Line Scan Cameras, http://www.automaatioseura.fi/jaostot/mvn/mvn6/paperweb.html, vol. 6, 2000, 4 pgs.
Fiber Optic Machine Vision Line Array, http://www.stockeryale.com/foi/components/machine_vision_line_arrays.pdf, 2002, 2 pgs.

(Continued)

*Primary Examiner*—Anh V. La
(74) *Attorney, Agent, or Firm*—Foley & Lardner LLP

(57) ABSTRACT

A LED lighting system for reading multiple data matrix codes on device populated transport media with a line scan camera, includes a light housing, a plurality of LED circuit bars, having a plurality of LEDs, mounted to an inner surface of the light housing arranged to provide high angle lighting and low angle lighting and a light controller operatively connected to the light housing to selectively control the light intensity, the light distribution and the angle of the LEDs on each of the plurality of LED array bars, whereby the LED lighting system can reduce texture noise and detect contrast in color or contrast in texture on the device populated transport media. The LED lighting system includes a device cooling system having an air compressor for cooling the LEDs such that they can operate at an optimal level.

10 Claims, 9 Drawing Sheets

OTHER PUBLICATIONS

U.S. Appl. No. 60/666,199, filed Mar. 30, 2005, Kumar et al.
U.S. Appl. No. 11/392,997, filed Mar. 30, 2006, Kumar et al.
U.S. Appl. No. 60/666,196, filed Mar. 30, 2005, Uekert et al.
U.S. Appl. No. 11/392,952, filed Mar. 30, 2006, Uekert et al.

* cited by examiner

LED LIGHTING SYSTEM FOR LINE SCAN CAMERA BASED MULTIPLE DATA MATRIX SCANNERS

CROSS-REFERENCE TO RELATED PATENT APPLICATIONS

This instant application claims priority to and benefit of U.S. Provisional Application 60/666,307 filed Mar. 30, 2005 the disclosure of which is incorporated by reference herein in its entirety.

FIELD OF INVENTION

The present invention relates generally to an LED lighting system, and more particularly to an LED lighting system for a line scan camera based multiple data matrix scanner.

BACKGROUND OF THE INVENTION

Semiconductor devices are commonly sorted into different categories based on performance characteristics determined during test by specialized processing equipment. Transport media include any fixture or carrier designed for transporting semiconductor devices internal or external to the processing equipment. An example is a plastic tray as specified by the JEDEC Design Standard. In most cases, the processing equipment has a vision system and a lighting system to aid in identifying and sorting the devices.

Generally, conventional lighting systems for processing equipment provide low intensity lighting. Conventional systems typically use a single light bar to provide lighting for line scanning functions. The single light bar may provide sufficient illumination to allow a scanning camera to detect contrast in color and contrast in texture. However, scanners using conventional lighting do not clearly discern the difference of manufacturing texture from two dimensional data matrix code texture. Moreover, due to the characteristics of the single light bar contrast in color and contrast in texture can not be detected simultaneously. To detect either contrast in color or contrast in texture the light bar must be physically repositioned. Further, in conventional lighting systems surface mount LEDs are used. In some instances, repositioning the LEDs affords a line scanner the opportunity to capture more accurate images. However, surface mount LEDs are difficult to reposition. Therefore, a lighting system having a large exposure area is needed that can reduce texture noise and detect contrast in color and texture with minimal configuration. Further, the lighting system should provide high performance and longevity at a low cost.

SUMMARY OF THE INVENTION

According to one embodiment of the invention, a LED lighting system for reading multiple data matrix codes on a device populated transport media with a line scan camera, comprises a light housing, a plurality of LED circuit bars, having a plurality of LEDs, mounted to an inner surface of the light housing arranged to provide high angle lighting and low angle lighting, wherein at least one of the plurality of LED arrays has a plurality of LEDs mounted on a mounting surface of the LED circuit bar that faces the transport media at an angle of sixty degree or less relative to the mounting surface of the LED array, and a light controller operatively connected to the light housing to selectively control the light intensity, the light distribution and the angle of the LEDs on each of the plurality of LED array bars, whereby the LED lighting system can reduce texture noise and detect contrast in color or contrast in texture on a device populated transport media.

DETAILED DESCRIPTION

Figure 9:
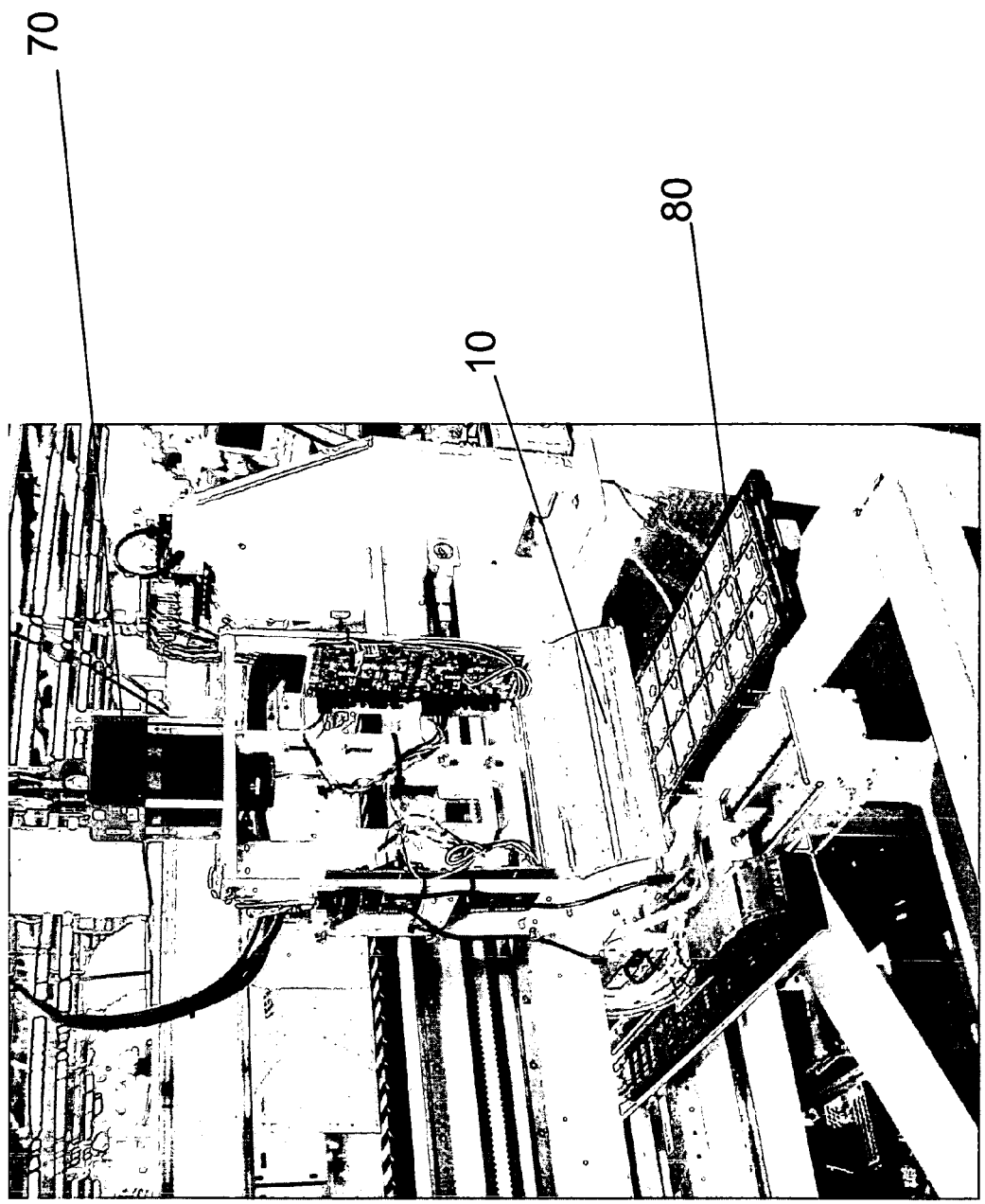
FIG. 9 is a perspective view of automated handler equipment incorporating the LED lighting system.

An exemplary LED lighting system according to the present invention is now described in reference to the accompanying drawings. It will be appreciated that the lighting system according to the invention may be used advantageously with a backend IC automated handling machine (for example, as shown in FIG. 9) that sorts devices into categories based on a unique identification code on each device. In turn, each code is associated with a category number. The automated handling equipment uses a vision system or scanner to identify each device. The system keeps track of the device location inside each tray and sorts them into trays, particularly JEDEC trays, such that devices of the same category are in the same tray. Of course, other applications may be apparent to those skilled in the art.

Figure 1:
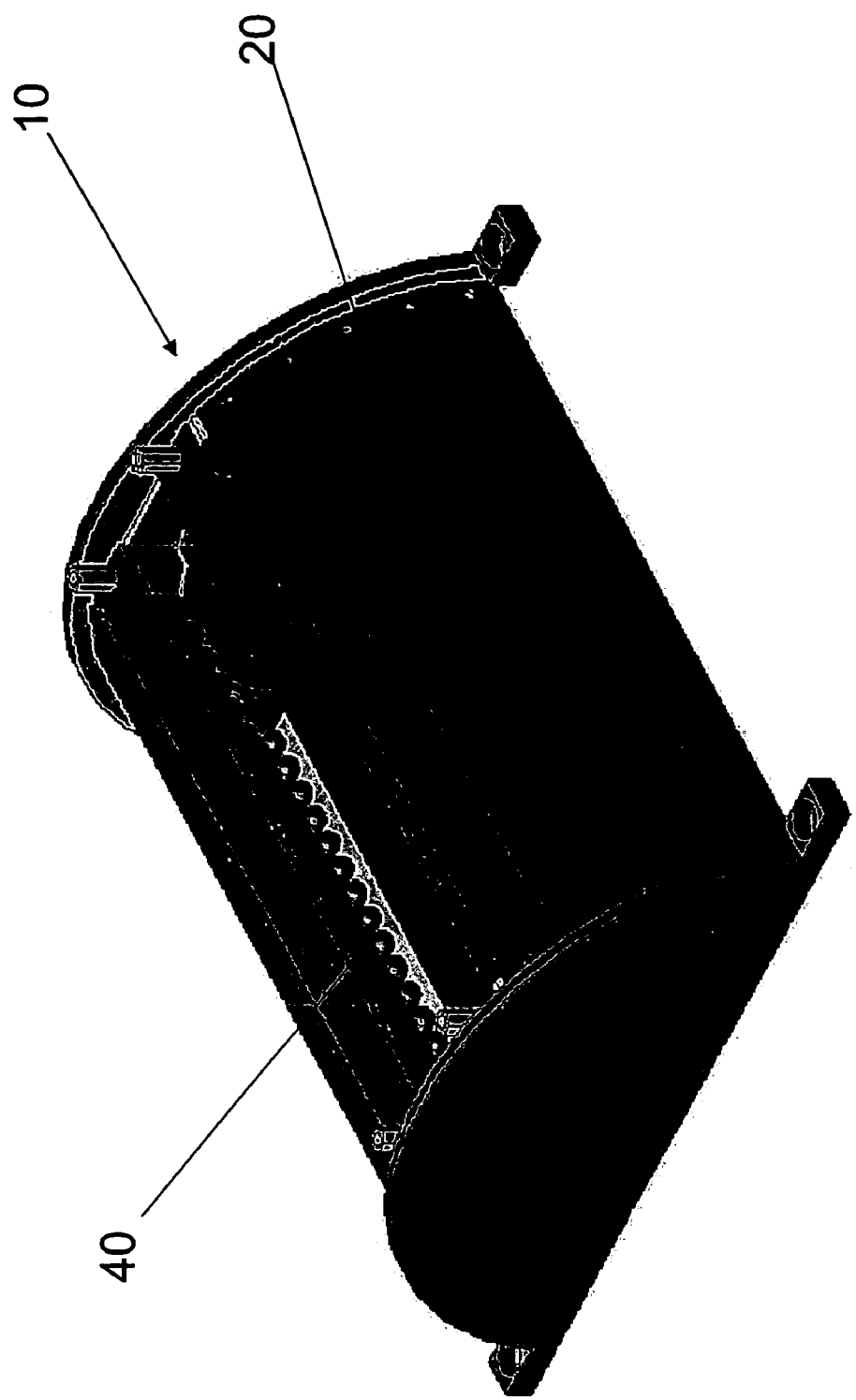
FIG. 1 is a perspective view of the LED light housing according to one embodiment of the present invention.
Figure 4:
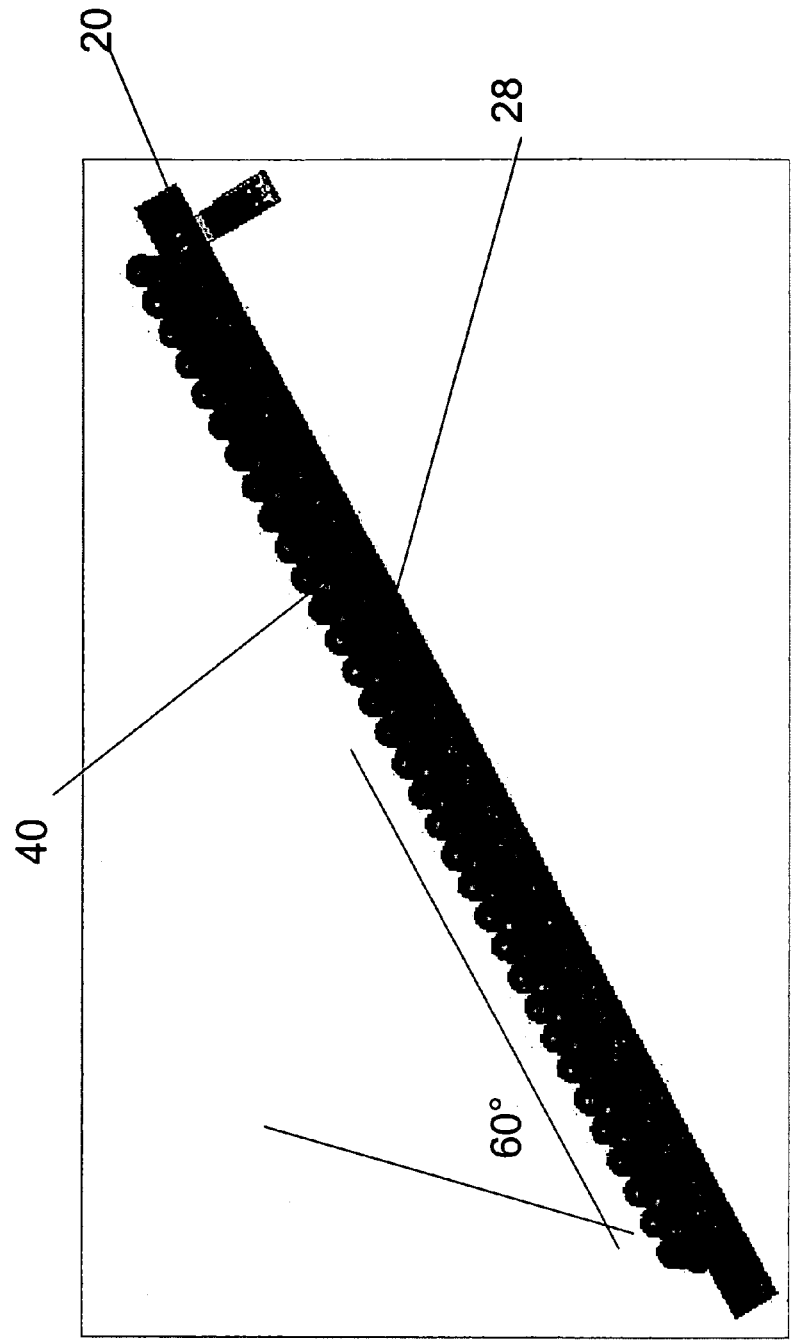
FIG. 4 is a perspective view of a LED circuit bar according to one embodiment of the present invention, which shows the angular orientation of the LEDs.
Figure 5:
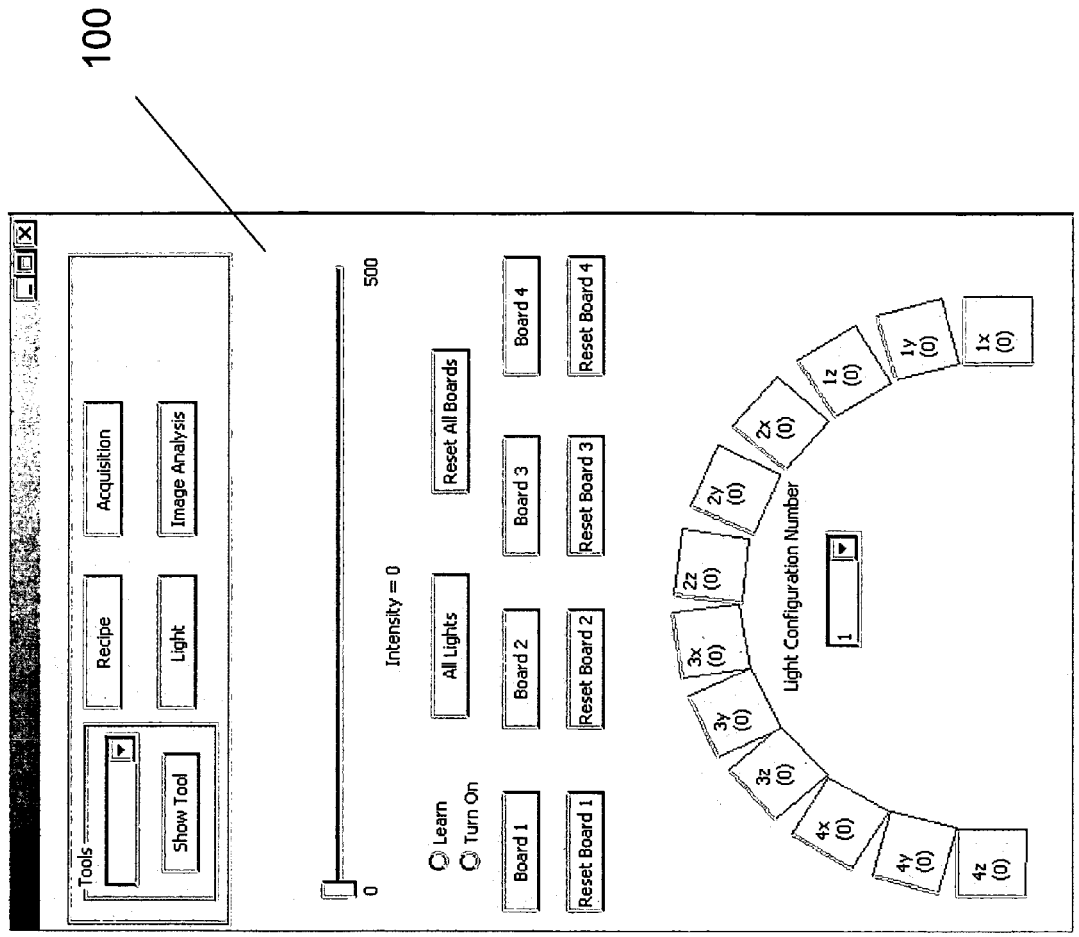
FIG. 5 is a user interface for the light controller according to one embodiment of the present invention.

As shown in FIGS. 1, 4 and 5 the LED lighting system 1 has a LED light housing 10 formed in a half-cylindrical shape. The inner surface of the LED light housing 10 is populated with a plurality of individual LEDs 40 mounted in arrays to LED circuit bars 20. The light housing 10 is configured so that a tray 80, such as a JEDEC tray is exposed to uniform lighting. Preferably, the LEDs 40 are five mm red LEDs with a maximum intensity greater than or equal to 8300 mcd and a wave length of 630 nm. Other LEDs 40 of different sizes, wavelength and intensity (preferably having a brighter intensity) may also be used.

The LED lighting system 1 allows a line scan camera 70 positioned above an opening 90 in the light housing 10 to read multiple two-dimensional data matrix codes on a JEDEC tray 80 disposed under the light housing 10. The data matrix codes can be discerned from color contrast or from texture differences created by the LED 40 lighting. The LED system 1 includes a control system 30 (shown in FIG. 10) that can manipulate the light intensity of each LED array mounted on a circuit bar 20 as well as the light distribution in a horizontal (x-axis), vertical (y-axis) and axis of the scanning line (z-axis) without making a change in the actual system hardware. The lighting system 1 also illuminates the JEDEC tray 80 such that a line scan camera 70 can identify whether devices are completely in the JEDEC tray's 80 pockets and/or identify the orientation of the devices on the JEDEC tray 80.

Figure 2:
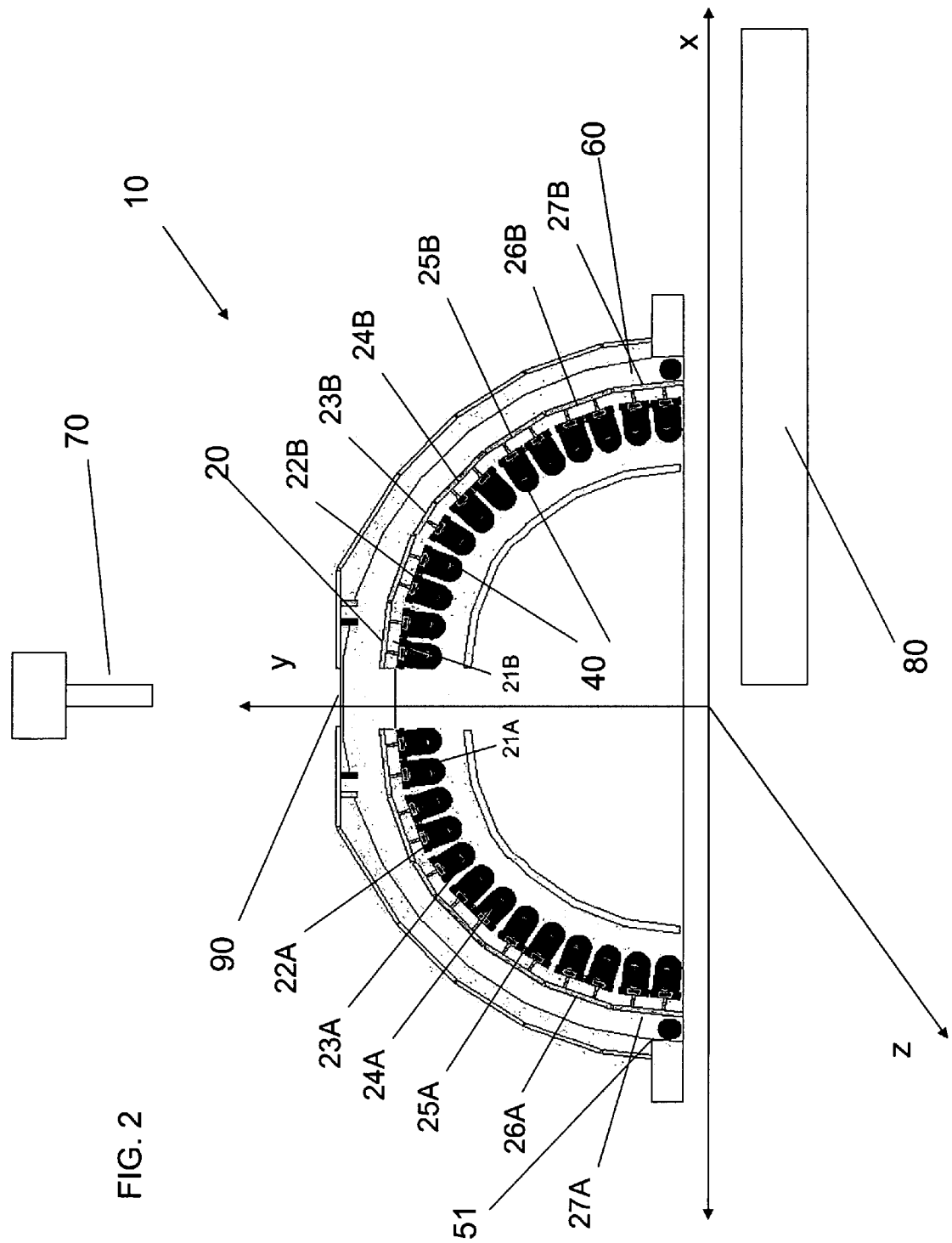
FIG. 2 is a sectional view of the LED light housing according to another embodiment of the present invention.
Figure 6:
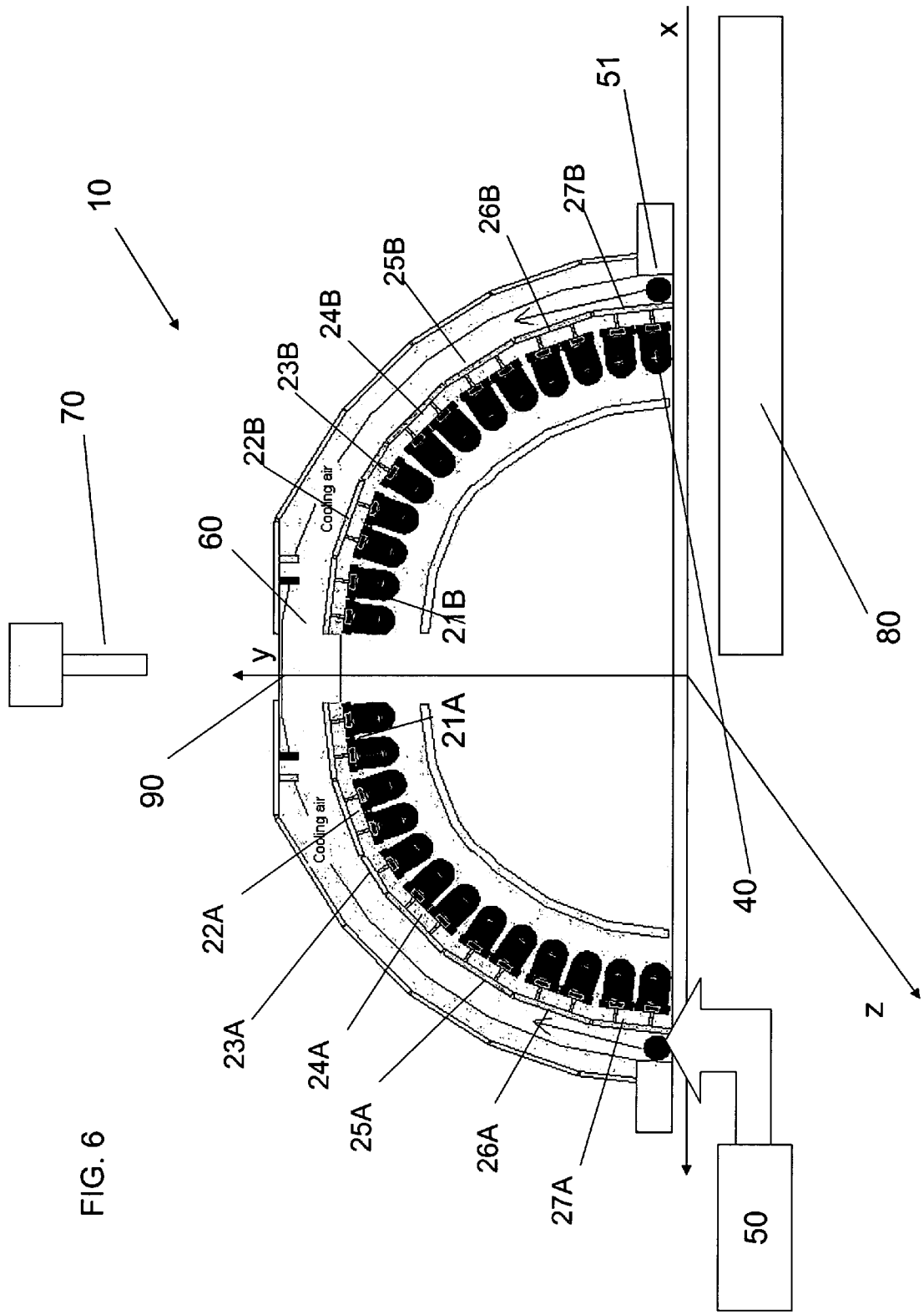
FIG. 6 is a sectional view of the LED light housing according to one embodiment of the present invention.
Figure 7B:
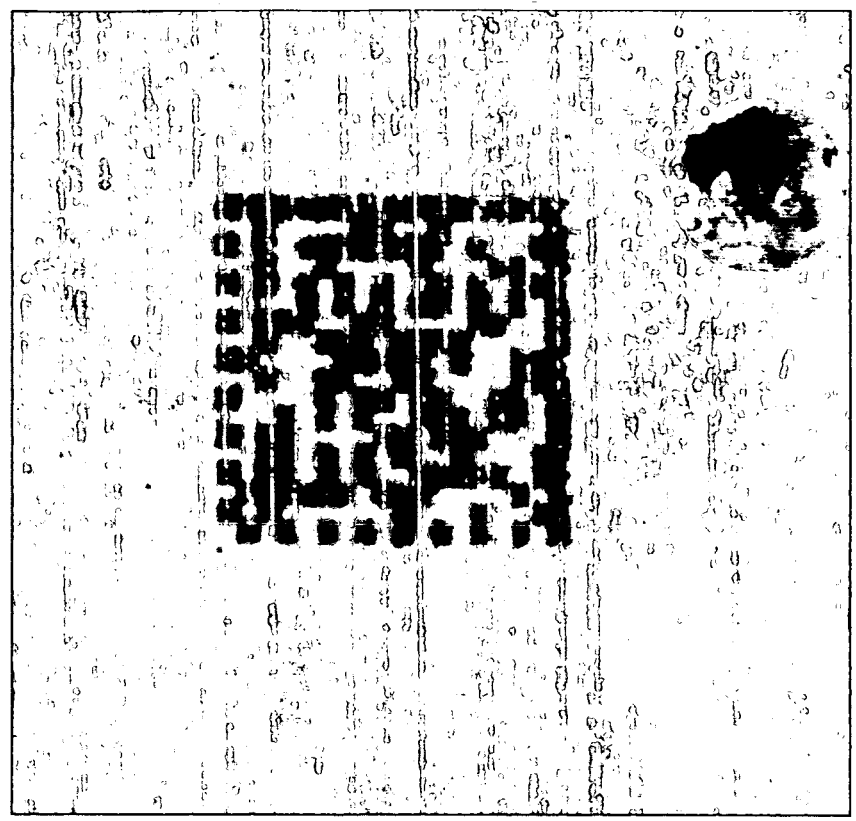
FIG. 7(A)-(B) are images illustrating color data matrix code contrast and texture data matrix code contrast on devices on a JEDEC tray.
Figure 7A:
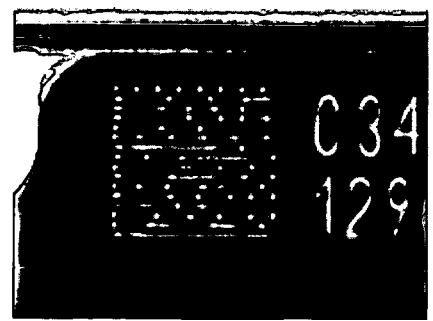
Figure 8A:
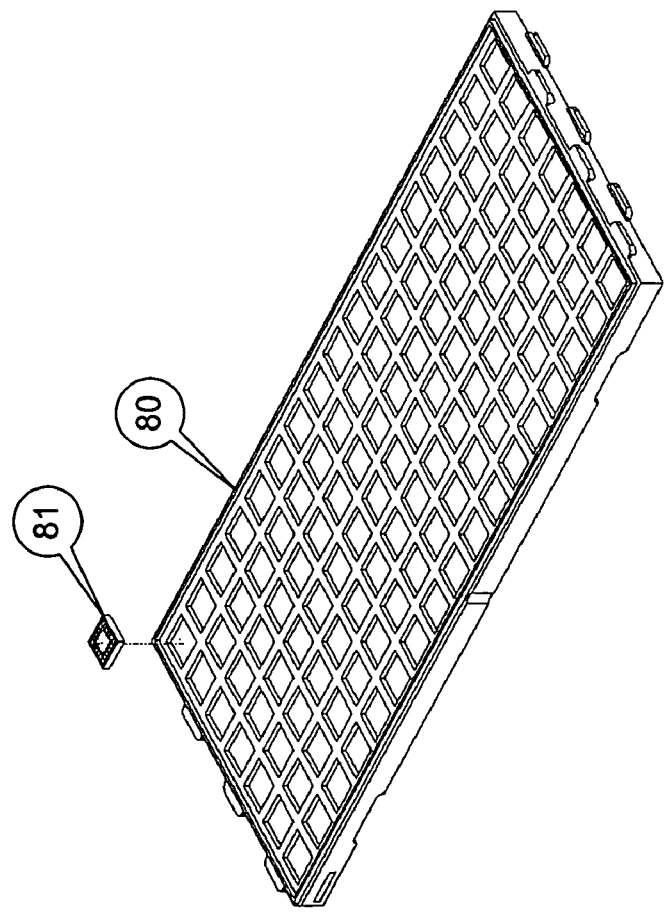
FIGS. 8A and 8B is a perspective view and a top view of a JEDEC tray, respectively.
Figure 8B:
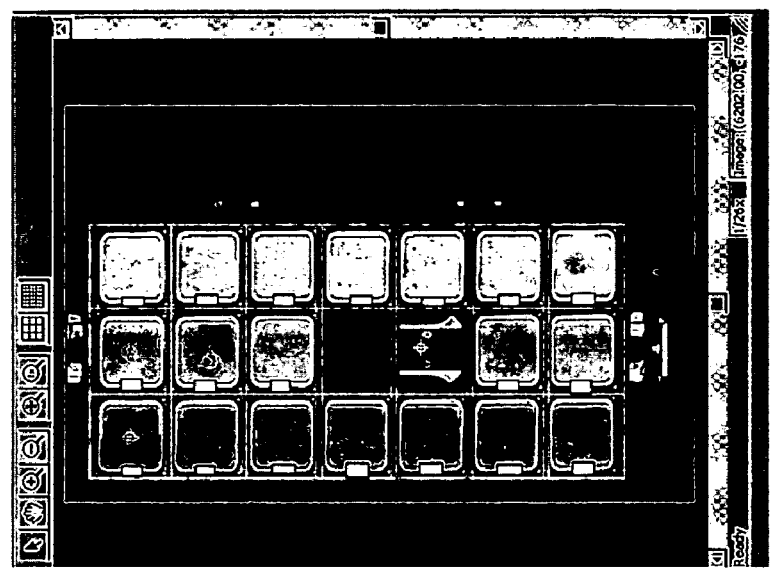

As shown in FIGS. 2 and 6, the LED system 1, according to an embodiment of the invention, applies both high angle and low angle lighting. The circuit bars 21A-27A and 21B-27B are positioned at various angular positions within the light housing 10 relative to the tray 80 being illuminated. According to one embodiment of the present invention, low angle lighting is relative to high angle lighting. For example, high angle lighting may be provided by a pair of LED circuit bars 21A, 21B mounted at a top position, near but less than a ninety degree angle relative to the tray 80 being illuminated. Low angle lighting is provided by LED circuit bars 22A-27A and 22B-27B, and are mounted at angle less than ninety degrees. Generally, high angle lighting is used to detect a color difference in two dimensional data matrix codes and low angle lighting is used to detect a texture difference in a two dimensional data matrix codes.

Figure 3:
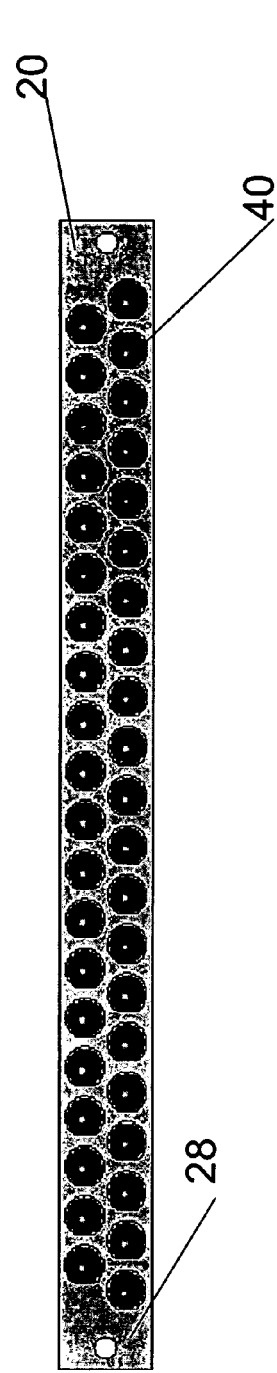
FIG. 3 is a front view of a LED circuit bar according to one embodiment of the present invention.

As shown in FIG. 3, a plurality of LEDs 40 are mounted to LED circuit bars 20. In turn, the LED circuit bars 20 are mounted to the inner surface of the LED light housing 10. The LEDs 40 are mounted so that they are evenly spaced on the LED circuit bars 20. Preferably, the LED circuit bars 20 have two rows of LEDs 40. Further, the dimensions of the circuit bars 20 are such that they are longer than the width of a conventional JEDEC tray 80. For use with standard JEDEC trays 80, the LED circuit bars 20 may have a length of about eight inches. However, the length of the circuit bars 20 and the number of LEDs 40 that populate the bars may change.

As shown in FIG. 3, some of the LED circuit bars 20 have LEDs mounted at a ninety degree angle relative to the mounting surface 28 of the circuit bar 20. According to a feature of the invention, two of the LED circuit bars 20 have LEDs 40 mounted at a 60 degree angle relative to the LED mounting surface on the circuit bar 20, and two circuit bars mounted at a −60 degree angle relative to the LED mounting surface on the circuit bar 20. This configuration is better illustrated in FIG. 4.

Referring to FIGS. 2 and 6, a plurality of circuit bars 20 may possess LEDs 40 mounted at angles less than or equal to sixty degrees relative to the LED mounting surface 28. Preferably, according to one embodiment of the invention, two circuit bars have LEDs 40 mounted at a −60 degree angle in relation to the z-axis (where the z-axis is parallel to the longitudinal axis of the circuit bar 20) and two circuit bars have LEDs 40 mounted at a +60 degree angle in relation to the z-axis. In particular, according to the particular embodiment of the present invention, circuit bar 25A and 22B posses LEDs 40 mounted in a positive 60 degree angle along the z-axis. Further, circuit bars 25B and 22A possess LEDs 40 mounted in a negative 60 degree angle along the z-axis. In effect, the LED circuit bars 20 having the angled LEDs 40 creates an additional direction of lighting along a scanning line in the z-axis. Thus, the LED light housing 10 produces uniform lighting in all directions. The light housing 10 having the above configuration provides light on a JEDEC tray 80 such that the manufacturing texture of devices in the tray is ignored and the two dimensional matrix code texture is enhanced. This enables a line scan camera 70 to accurately capture images of a JEDEC tray 80. Of course, orientations and configurations different from the particular example shown are possible.

Figure 10:
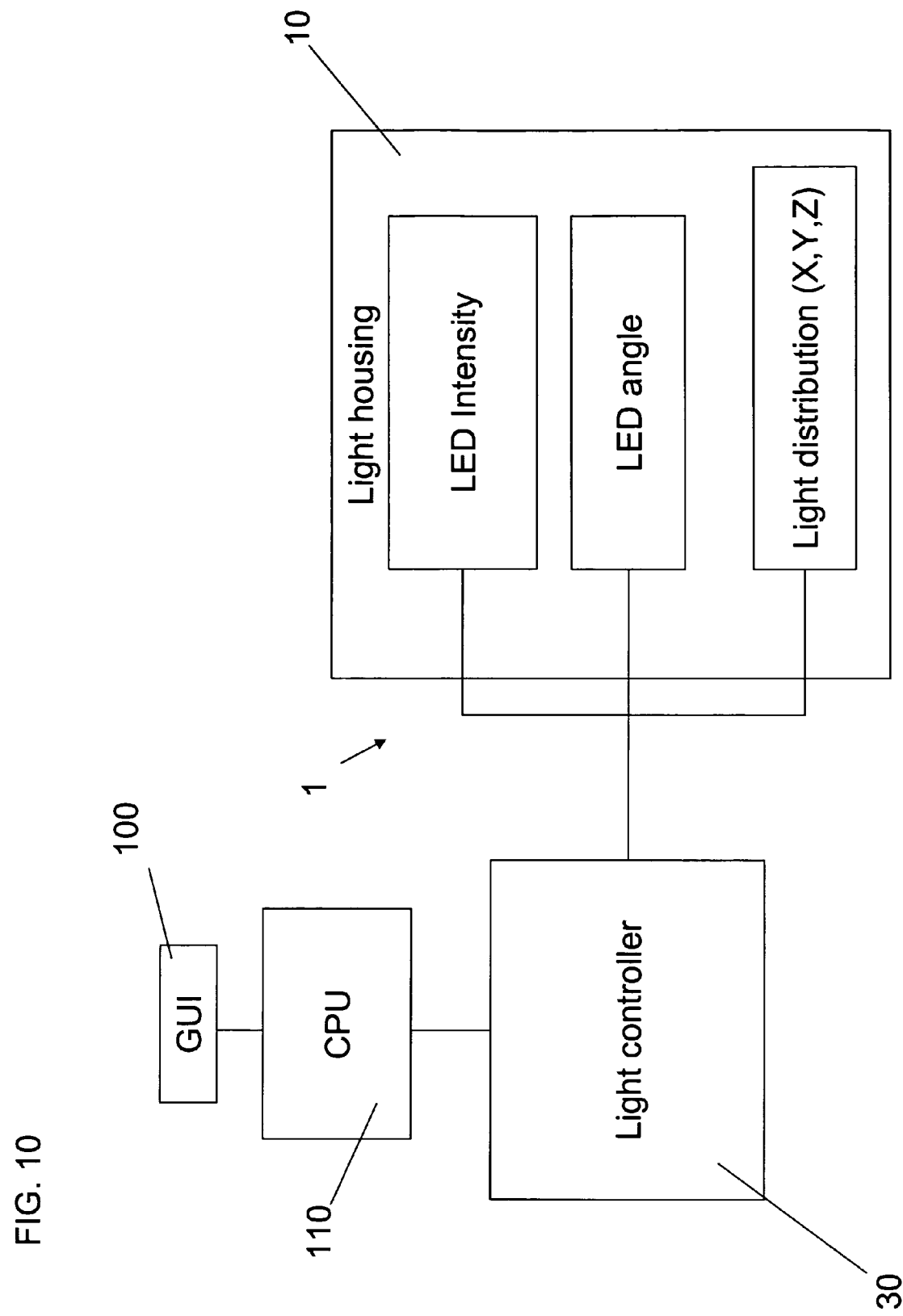
FIG. 10 is a block diagram of the LED light system according to one embodiment of the present invention.

As shown in FIG. 10, light intensity is controlled by a channel light controller 30. The light controller 30 may be connected to the LED light system 1 using any known conventional method of making an electrical connection such as wire or cable. The light controller 30 is further operatively coupled to a processor 110 which is capable of displaying, and receiving information via a graphical user interface (GUI) 100. An exemplary embodiment of a graphical user interface 100 for the light controller 30 is shown in FIG. 5. As shown, the level of light and its distribution are measured and controlled by the channel light controller 30. Preferably, the light controller 30 has twelve channels. Each channel corresponds to a LED circuit bar 20 labeled as 4$x$, 3$z$, 2$z$, 1$x$, etc. In this example, the controller manages the electric current of each channel between a range such as between 0 and 500 mA. The number of channels may vary. In addition, the operating current may vary.

The GUI 100 in FIG. 5 displays exemplary user options for configuring the LED light system 1. The GUI provides functionality to enable a user to load preset configurations ("Light Configuration Number"), reset a group of circuit bars ("Reset Board 1", etc), select a group of circuit bars ("Board 1", etc.), and change the intensity of the LED lighting (Intensity slide bar). The "Learn" selection allows a user to first set the lighting configuration without having that configuration implemented by the physical LED system 1. Alternatively the "Turn On" selection implements the user defined lighting configuration on the actual LED system 1. The "Light" option displays light readings to a user based on the light generated from the LED system 1. The "Recipe," "Acquisition," "Image Analysis," and "Show Tool" options relate to functionality of the line scan camera 70 used in conjunction with the LED light system 1.

As shown in FIG. 6, the LED system 1 may include a cooling system 50. The cooling system 50 controls the temperature of the LEDs 40. The cooling system 50 applies cooling air to an outer chamber 60 of the LED light housing 10. Preferably, the cooling system 50 is fluidly connected to the LED lighting system via an air connecter 51. As shown in FIG. 6, an air connector 51 is located within the outer chamber 60 of the light housing 10. The air connector 51 is configured to connect to a conventional cooling system 50 that is present in the environment surrounding the LED light system 1. As shown in FIG. 6, according to one embodiment of the invention, air flows from the bottom of the LED light housing 10 and escapes out of the opening 90 positioned at the top of the LED light housing 10.

The cooling system serves to improve the overall LED quality of the LED lighting system 1. The intensity of an LED 40 lowers as the temperature rises. In addition, LEDs 40 may burn out at a high temperature. In effect, the cooling system 50 increases the brightness of the lighting system by keeping the LEDs 40 at an optimal operating temperature. The intensity of the LED lights 40 is sensitive to temperature. Preferably, the cooling system 50 maintains the LED temperature in the range of 30 to 50 degrees Celsius to counteract the affects of the rising temperatures.

The LED system as described provides several advantages. It provides configurable lighting to change light intensity and angle for the line scan camera to reduce texture noise and read color based data matrix code and texture based data matrix code. Further, it provides low cost lighting for the line scan camera with low cost LEDs. Moreover, it provides long life and high performance lighting for the line scan camera with the long life and high performance LEDs. Finally, it provides a larger light exposure area which makes it easy to mount the line scan a camera.

The present invention can be used advantageously with semiconductor processing and handling equipment as described in commonly owned and co-pending provisional patent application entitled "Process for Handling Semiconductor Devices and Transport Media in Automated Sorting Equipment" Ser. No. 60/666,196, filed on Mar. 30, 2005, herein incorporated by reference in its entirety and commonly owned and co-pending provisional patent application entitled "Machine Vision Based Scanner Using Line Scan Camera for JEDEC Trays with Devices" Ser. No. 60/666, 199, filed on Mar. 30, 2005 herein incorporated by reference in its entirety.

Although the invention has been described in reference to a particular embodiment, various other embodiments and modifications will be apparent to those skilled in the art. It is therefore intended that the foregoing description of a preferred embodiment be considered as exemplary only.

What is claimed is:

1. A LED lighting system for reading multiple two-dimensional data matrix codes on a semiconductor device-populated transport media with a line scan camera, comprising:
    a light housing;
    a plurality of LED arrays mounted to an inner surface, wherein at least one of the LED arrays has a plurality of LEDs mounted on a mounting surface of the LED array at an angle in the range of sixty to zero degrees relative to the mounting surface; and
    a light controller operatively connected to the light housing to selectively control the light intensity, the light distribution and the angular orientation of the LEDs on each of the plurality of LED arrays, whereby texture noise is reduced and a detector can detect contrast in color or contrast in texture on the device populated transport media.

2. The LED lighting system of claim 1, further comprising a cooling system having a continuously operable air compressor configured to cool the LEDs.

3. The LED lighting system of claim 1, wherein the light housing comprises an outer chamber.

4. The LED lighting system of claim 1, wherein the light housing is formed in a half-cylindrical shape.

5. The LED lighting system of claim 4, wherein the LED arrays are arranged at different angular positions within the light housing.

6. The LED lighting system of claim 1, wherein the plurality of LEDs are spaced evenly along the LED circuit bar.

7. The LED lighting system of claim 1, wherein at least one of the plurality of LED circuit bars has a plurality of LEDs mounted at a +60 degree angle relative to the mounting surface.

8. The LED lighting system of claim 1, wherein at least one of the plurality of LED circuit bars has a plurality of LEDs mounted at a −60 degree angle.

9. The LED lighting system of claim 1, wherein the light controller has multiple channels, each for controlling one of said plurality of LED arrays.

10. The LED lighting system of claim 1, wherein the LEDs are 5 mm red LEDs and have a maximum intensity greater than or equal to 8300 mcd.

* * * * *